United States Patent [19]

Uram

[11] Patent Number: 4,721,567
[45] Date of Patent: Jan. 26, 1988

[54] CERAMIC POURING FILTER WITH TORTUOUS FLOW PATHS

[75] Inventor: Stuart Z. Uram, Alpine, N.J.

[73] Assignee: Certech Inc., Wood-Ridge, N.J.

[21] Appl. No.: 617,909

[22] Filed: Jun. 6, 1984

[51] Int. Cl.$^4$ ................ B01D 25/08; C04B 38/00
[52] U.S. Cl. .................. 210/489; 210/497.3; 210/498; 210/510.1; 164/358
[58] Field of Search ............ 210/314, 355, 336, 488, 210/489, 492, 496, 498, 510.1; 55/523, 489; 164/358

[56] References Cited

U.S. PATENT DOCUMENTS

| | | | |
|---|---|---|---|
| 1,030,066 | 6/1912 | Erlandson | 164/358 |
| 1,915,004 | 6/1933 | Schmeller, Sr. | 164/358 |
| 2,835,007 | 5/1958 | Hoefer | 164/358 |
| 3,052,360 | 9/1962 | Imershein | 210/488 |
| 3,362,140 | 1/1968 | Mott | 55/523 |
| 3,633,751 | 1/1972 | Stevens | 210/336 |
| 3,693,750 | 9/1972 | Takkunen | 210/510.1 |
| 3,731,815 | 5/1973 | Collingwood et al. | 210/510.1 |
| 3,812,972 | 5/1974 | Rosenblum | 210/498 |
| 3,984,044 | 10/1976 | Breton et al. | 210/510.1 |
| 4,158,632 | 6/1979 | Dantzig et al. | 210/498 |
| 4,196,027 | 4/1980 | Walker et al. | 210/498 |

Primary Examiner—Richard V. Fisher
Assistant Examiner—Wanda L. Millard
Attorney, Agent, or Firm—Amster, Rothstein & Ebenstein

[57] ABSTRACT

A ceramic pouring filter for use in the casting of molten metal comprises a number of closely spaced apertured elements defining filtering cavities there between with their apertures staggered so that the metal flowing out of the apertures of one element passes through a restriction before entering the apertures of the next element.

4 Claims, 21 Drawing Figures

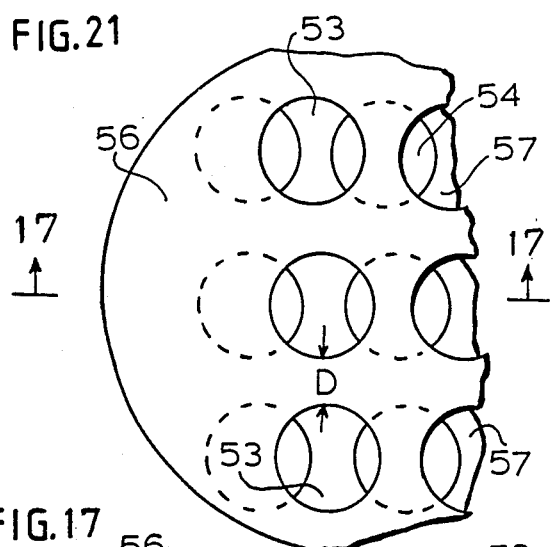
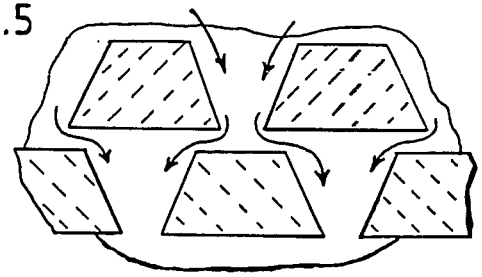
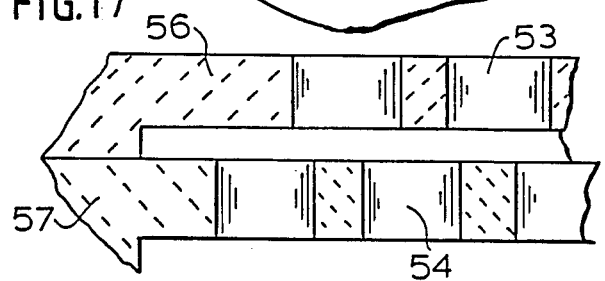
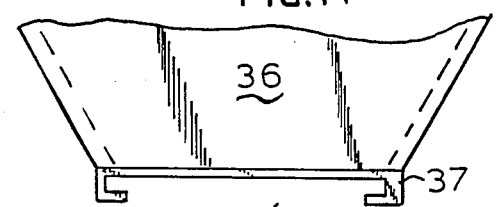
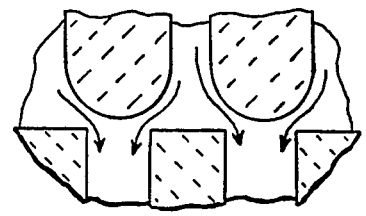
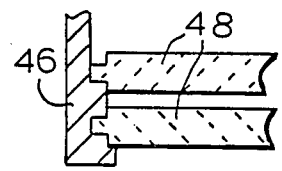
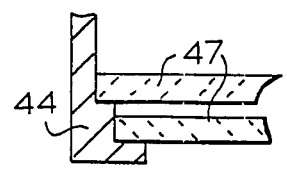
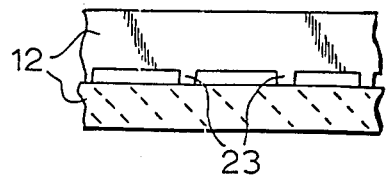
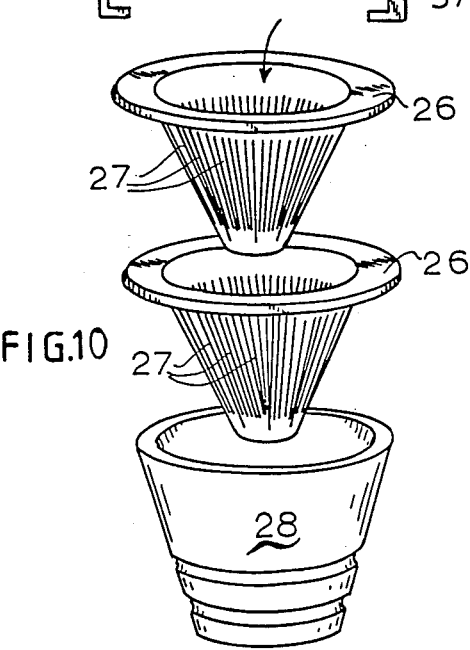
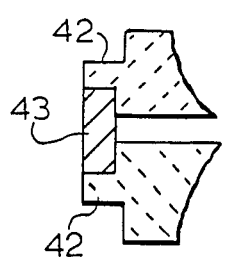
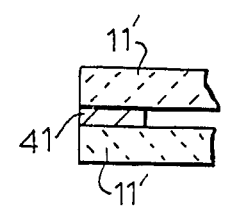

CERAMIC POURING FILTER WITH TORTUOUS FLOW PATHS

BACKGROUND OF THE INVENTION

This invention relates to ceramic pouring filters for use with molten metal, for instance, in the casting of molten metals, such as nickel base high temperature alloys used in casting of turbine blade elements, iron, aluminum or stainless steel. It is customary to pass the molten metal through a pouring filter before it enters the mold cavity.

The commercially available filters for such uses are of various types. Cellular ceramic filters, which have a honeycomb type of construction made up relatively deep cells of square cross-section, are described in the article by Day in Modern Casting, April, 1984, pages 16–18. Among the other types of commercial filters are ball filters, bonded particles, bonded or fused foam filters and fibrous filters. A ball filter is essentially a relatively deep box filled with balls, usually of about $\frac{3}{4}$ inch diameter, of alumina or similar ceramic material. A bonded particle filter is made by bonding together grains of a ceramic material, which may be fabricated from crystalline aluminum oxide or silicon carbide for instance. One type of foam filter is a porous foam of phosphate-bonded alumina or zircon. A foam filter may be prepared by a method which involves impregnating an organic foam (such as polyurethane foam) with a dispersion of ceramic ingredients, followed by firing, during which the organic foam is burned away. Fibrous filters may be of woven fiberglass or of non-woven ceramic fibers.

In accordance with one aspect of this invention a pouring filter, for use in the casting of molten metals, comprises a plurality of multiply apertured ceramic elements, which are closely spaced, with their apertures in staggered relationship. The filter is strong, economical to manufacture, readily inspectable to insure against hidden internal defects present in other filters, and provides controlled removal of fine particles of undesired impurities at good flow rates.

The invention is illustrated in the accompanying drawings in which,

FIGS. 5 and 6 are cross-sectional views of portions of stacks of (differently) modified filter plates.

FIG. 7 is a cross-sectional view, taken in a plane running along an upper slot, of a portion of a stack comprising another embodiment.

FIG. 10 is an exploded three-dimensional view of a conical filter and pouring cup.

FIG. 14 is cross-sectional view of the bottom portion of a pouring cup having a retainer for a stack of filter plates.

FIGS. 15 and 16 are cross-sectional views of a portion of stack of filter plates, illustrating spacing arrangements.

FIG. 17 is a cross-sectional view of the stack shown on FIG. 21.

FIGS. 18 and 19 are cross sectional views of portions of filter retainers, holding filter stacks.

FIG. 21 is a plan view of a portion of a stack of plates with round holes.

Figure 1:
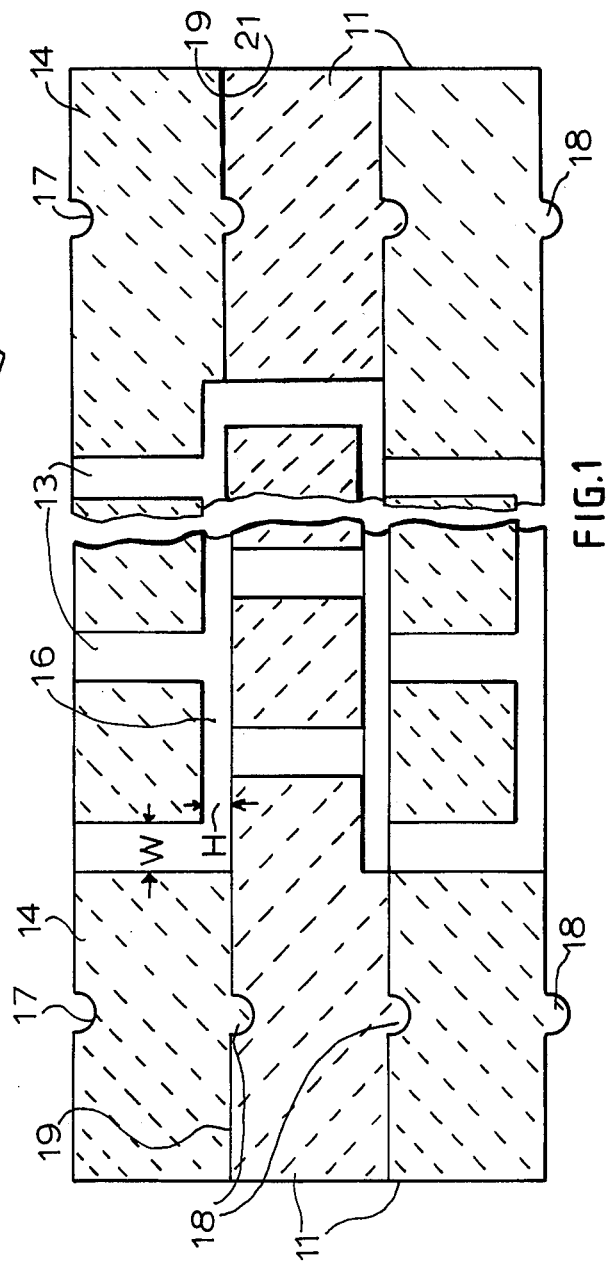
FIG. 1 is a cross-sectional view of a stack of filter plates.

The filter in FIG. 1 is composed of a series of slotted ceramic plates. A stack of 3 such plates is illustrated, but it will be understood that a stack may be made up of simply two plates and that more than three plates may be used. Each plate 11 has a slotted portion, composed of alternating ribs 12 and slots 13 and a slightly thicker peripheral portion 14. Accordingly, when the peripheral portions of adjacent plates are in face-to-face contact (as shown) there is a shallow space 16 between the ribs of one plate and those of the adjacent plate. The plates are positioned with the slots of one plate staggered with respect to those of the next plate so that the metal flows in a tortuous path as shown by the arrows: first through a slot, then through a restriction (the shallow space 16) and then through a slot of the plate below it.

The plates may be kept in this staggered relationship by any suitable means; thus the plates 11 may have depressions 17, and nubs 18 which fit into those depressions, so as to fix the relative positions of adjacent plates.

The height H of the restricted passage defines a filter distance or planar relief cavity connecting the outlets of the upper slots with the inlets of the slots in lower plates (i.e., the shallow space 16) is preferably less than the width W of the slots, so that the arrangement acts as a fine filter, to block passage of particles small enough to pass through the slots.

It will be seen that almost every slot (except for slots adjacent to the thicker peripheral portion) has two outlets through the shallow space 16. This makes possible fine filtration without significant reduction in the open area available for flow of the molten metal through the filter. For instance, even when the height H of the shallow space is only one-half the width W of the slots the cross-sectional area available for flow of the metal through the shallow space is substantially the same as that for simple flow through the slots. In contrast, if the width of the slots were halved to accomplish similar filtration while keeping the widths of the ribs unchanged (to avoid weakening the structure), the cross-sectional area for flow would be cut in half.

Figure 3:
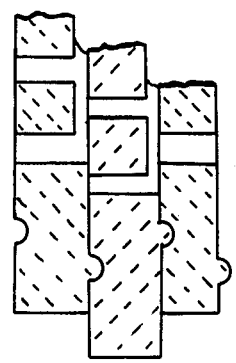
FIG. 3 is a cross-sectional view of a stack of plates having asymmetric positioning means.
Figure 2:
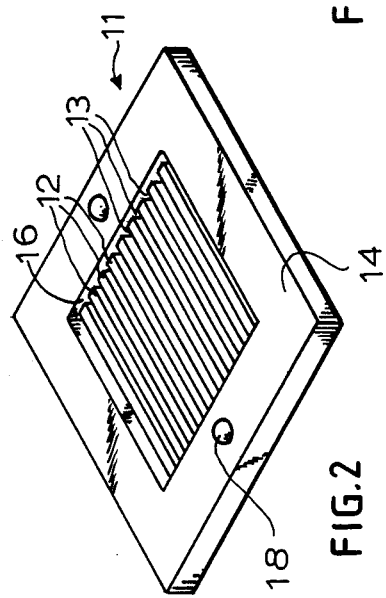
FIG. 2 is a three-dimensional view of a filter plate.

In the embodiment shown in FIGS. 1 and 2 the contacting faces 19, 21 of the peripheral portions of the plates 11 are smooth and flat so that the plates are kept in the desired alignment and there is no significant flow of metal out of the main path defined by the central zone containing the ribs and slots. Also, in that embodiment, the three illustrated plates are of identical construction, the middle plate being simply turned end-for-end with respect to the top and bottom plates. In that embodiment the slots and ribs are asymmetrically arranged (i.e., the slots at the extreme left and right sides of the top plate are at different distances from the corresponding edges of the plate.) It will be understood that one may employ instead plates whose slot arrangement is symmetrical (as shown in FIG. 3 for instance) with asymmetrical position-fixing means, so that when identical plates are stacked the desired staggered relationship of slots is obtained. It will also be understood that the plates of a stack need not be identical so long as they give the staggered relationship of the openings.

Figure 8:
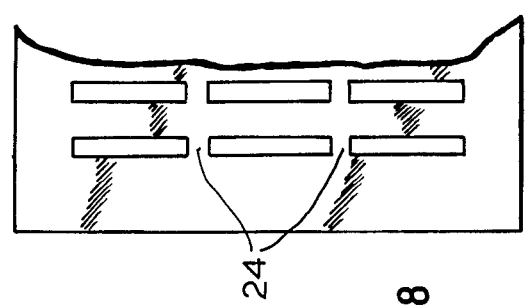
FIG. 8 is a plan view of a portion of a filter plate having connected ribs.
Figure 4:
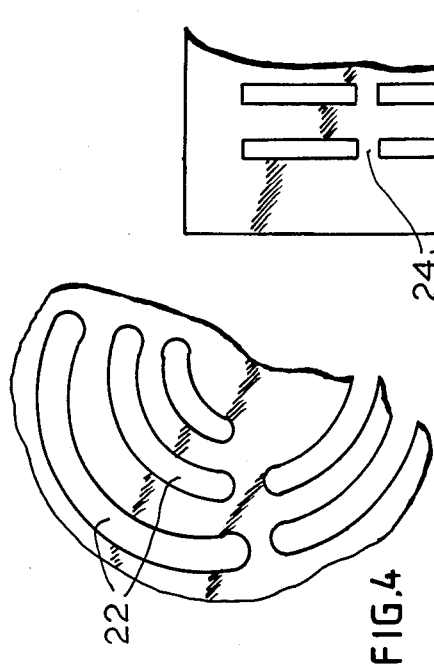
FIG. 4 is a plan view of a portion of a filter plate having curved slots.
Figure 9:
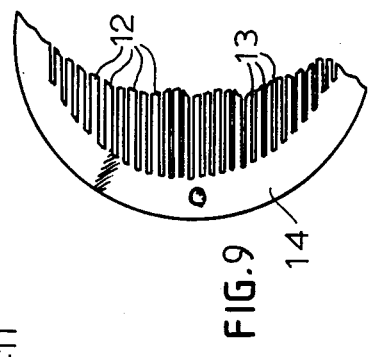
FIG. 9 is a plan view of a portion of a circular filter plate.

Variations may be made in the configurations of the apertures (e.g. slots 13) which pass through the plates and of the shallow spaces 16 into which those apertures lead. For instance, the apertures may be curved, instead of straight, slots 22 (FIG. 4 ). They may be tapered (FIG. 5). The downstream faces of the ribs may be curved (FIG. 6) to provide shallow spaces of varying effective diameter and filtering capacity, or they may have spaced extensions 23 as shown in FIG. 7 (which is a view taken from a plane running lengthwise of the slots and being within an upper slot and passing through a rib of the lower plate). The ribs may be joined by spaced integral reinforcing connectors 24, as in FIG. 8. The plates may be circular rather than rectangular (FIG. 9).

Figure 11:
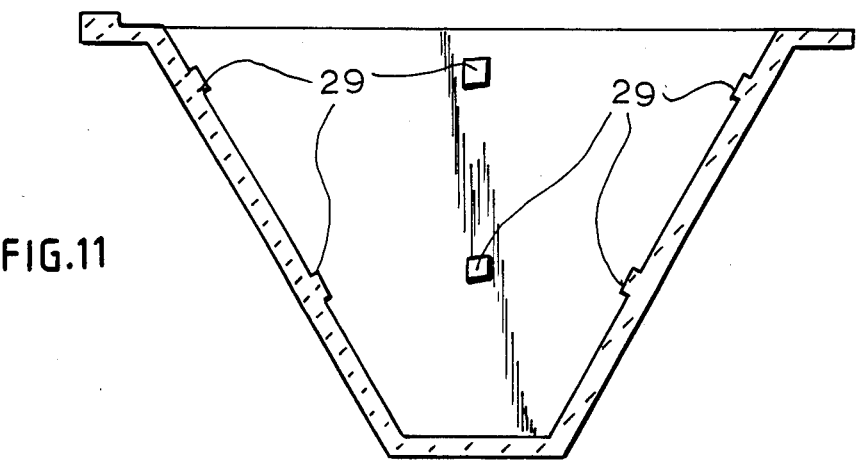
FIG. 11 is a cross-sectional view of a conical filter element.

The apertured elements need not be flat plates. For instance, they may be of slotted frusto-conical configuration (FIGS. 10,11), with one cone 26 nesting within the other, with the slots 27 of the cones in staggered relationship and with the cones being so supported (for instance in a conventional ceramic pouring cup 28 on top of a mold, not shown) that the desired shallow space is maintained between the outlets of the slots of the upper cone and the inlets of the slots of the lower cone. For instance, a cone may have shallow spacing bosses 29 as indicated in FIG. 11. Any suitable means may be provided for keeping the desired staggered relationship; for instance, an integral locating lug 31 may be positioned on the rim of one cup so as to fit into a corresponding locating recess in the rim of the adjacent cup.

Figure 12:
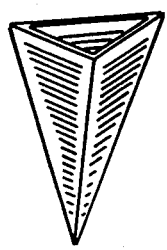
FIG. 12 is a three dimensional view of a pyramidal filter element.
Figure 13:
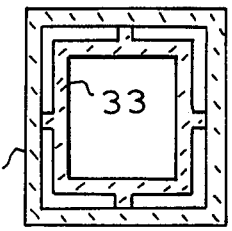
FIG. 13 is a cross sectional view of a filter comprising nesting tubes.

Instead of being conical the filter elements may be pyramidal or frusto-pyramidal (see, e.g., FIG. 12). They also may be tubular, of round or angular cross-section, as FIG. 13 in which one slotted tube 33 of rectangular cross-section is mounted within a similar but larger slotted tube, 34, being spaced therefrom a predetermined distance to establish the desired restricted passage between apertures, the slots (not shown) being in the predetermined staggered relationship; such tubular filters may be used in the known in-line filter systems which comprise replaceable cartridges of parallel filter tubes mounted in a refractory-lined box containing molten metal with the metal passing inwardly through the tube walls and then being fed from the tubes to the casting zone.

Successive filter elements may have different kinds of apertures. Thus, the filter may comprise a filter element (e.g., a plate) having long slots positioned just above, or below, an adjacent filter element having round holes. The filter may comprise elements of decreasing aperture width, e.g., the top elements may have the widest apertures, with lower elements having successively narrower apertures; for example, the filter may be made up of slotted plates, the slot widths being successively (starting at the top) about 3 mm, 2 mm and 1.5 mm, with each restricted passage having a height equal to about one-half the width of the apertures in the plate overlying that passage.

The filters of this invention may be positioned at locations within the mold, e.g., in the gating system of the mold, such as in the positions shown on page 18 of the Day Article mentioned above (e.g., at the base of a sprue, in a horizontally-parted runner system, in the sprue of a vertically parted mold, or after the reaction chamber for an in-the-mold nodulizing treatment). They may also be positioned outside the mold, e.g., at the base of a ceramic pouring cup 36 on top of the mold, the pouring cup (FIG. 14) being modified by providing at its base a flanged retainer 37 which provides a slot into which, for instance, the stack of flat filter plates may be slid.

Various other means for spacing and positioning the apertured filter elements may be employed. For instance, the spacing means may comprise separate thin strips or annular disks 41 (FIG. 15) disposed between the apertured plates 11'; such spaces may, for instance, be of ceramic, or of metal which may have a ceramic protective coating at zones where the spacing means could come into contact with the molten metal. The apertured plates may have extensions 42 (FIG. 16) of reduced thickness which may be engaged by separate spacing elements 43. The spacing means 44, 46 may be part of the retainer 37 which supports the apertured plates 47,48, as in FIGS. 18,19.

The filter elements of this invention are conveniently and economically prepared by conventional techniques used for injection molding of ceramic elements, e.g. by preparing a mixture of fine particles of ceramic material with a thermoplastic organic binder (such as a thermoplastic polymer) and then heating the mixture and injecting the resulting plastic mass into a cooled mold, followed by heating to remove (e.g., destroy) the binder and sinter the ceramic particles. The ceramic material is preferably a refractory ceramic capable of withstanding the molten metal being filtered, such as silica, alumina, aluminosilicate, zirconia, etc. Such injection molded ceramic is usually microporous (e.g. pores constitute about 10–40%, such as about 25%, of its volume) and relatively brittle (e.g. its modulus of rupture is in the range of about 1000 to 3000 psi; such as about 1500–2000 psi). Its porosity enhances its thermal shock resistance. It is within the broader scope of the invention, however to make the filter elements of stronger refractory ceramic material such as high fired alumina or zirconia having a modulus of rupture of the order of 50,000 psi.

Figure 20:
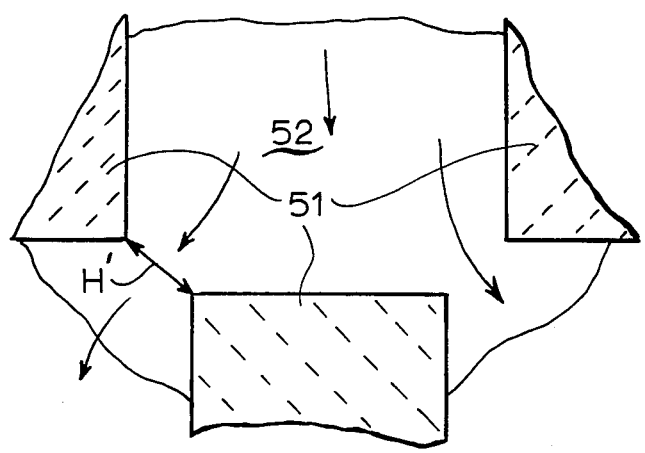
FIG. 20 is a cross-sectional view of a portion of a stack of filter elements in which the slots are wider than the ribs.

To provide strength for the filter elements, the ceramic structures between apertures (e.g., the ribs) are preferably relatively wide, above about 0.7 mm. such as about 1 to 4 mm. The slots or other apertures generally have widths equal to, more preferably less than, the widths of the ribs (or other intervening ceramic structures). However, the slots (or other apertures) may be somewhat larger than the widths of the ribs (or other intervening ceramic structures), as illustrated in FIG. 20 showing ribs 51 and slots 52. Here, the effective height of the shallow space is the distance H'.

The heights of the shallow spaces are usually in the range of about 0.2 to 4 mm. Preferably, as previously indicated, they are less than the widths of the apertures, such as less than about 0.8 mm., e.g., about 0.5 mm.

The filter elements preferably have a thickness of at least about 1 mm. One embodiment of the plate shown in FIG. 2 is a square of about 50 mm. by 50 mm, whose solid peripheral portion 14 has a width of about 10 mm and a thickness of about 4 mm, the height of the recessed portion 16 being about ½ mm, the ribs being about 2 mm wide and the slots having widths of about 1 mm.

The apertures need not be elongated in cross-section (e.g. slots). They may be round holes 53 and 54 for instance, as in the plates 56, 57 shown in FIGS. 21, 17. In these figures the spacing between holes is less than the hole diameter (width) and the effective filtering height of the shallow space is more than its actual height (as described in connection with FIG. 20). Such structures may be made conviently by the conventional pressing of a blend of ceramic and binder, particularly where the distance D between holes is greater than about 4 mm and is at least about half the hole diameter.

It is understood that the foregoing detailed description is given merely by way of illustration and that variations may be made without departing from the spirit of the invention.

I claim:

1. A ceramic filter for molten metal comprising a first frustro-conical and a second frustro-conical ceramic element positioned adjacent to each other and arranged to receive a stream of molten metal to flow therethrough, means maintaining a fixed position of said ceramic elements relative to each other, said first ceramic element having a first face and said second ceramic element having a second face, said ceramic elements being positioned with said first and second faces parallel and opposed to and spaced apart from each other, the distance between said faces defining a filter distance, each of said first and second ceramic elements having a plurality of slots formed therein defining flow passageways at an angle to said faces for the flow of molten metal therethrough, said slots in each of said ceramic elements being separated from adjacent slots by solid ceramic portions between said slots, said slots of each said ceramic element being offset relative to said slots of said other ceramic element and aligned with said solid portions of said other ceramic element, the width of said slots being greater than the filter distance between said faces, the space between said faces forming a plurality of filter passages of restricted height preventing movement through said filter passages of particles of a dimension larger than said filter distance, said first and second ceramic elements forming a flow path for the flow of molten metal through a slot in said first ceramic element which flow path turns and divides after it passes through said first ceramic element and then flows in two generally opposite directions through said filter passages between said ceramic elements and then turns again and flows through slots in said second ceramic element, said filter passages having the smallest transverse dimension of any part of the flow path of molten metal through said filter.

2. A ceramic filter as contained in claim 1 in which said slots are parallel to the axes of said frusto-conical elements.

3. A ceramic filter for molten metal comprising a first pyramidal ceramic element and a second pyramidal ceramic element positioned adjacent to each other and arranged to receive a stream of molten metal to flow therethrough, means maintaining a fixed position of said ceramic elements relative to each other, said first ceramic element having a first face and said second ceramic element having a second face, said ceramic elements being positioned with said first and second faces parallel and opposed to and spaced apart from each other, the distance between said faces defining a filter distance, each of said first and second ceramic elements having a plurality of slots formed therein defining flow passageways at an angle to said faces for the flow of molten metal therethrough, said slots in each of said ceramic elements being perpendicular to the axes of said ceramic elements and separated from adjacent slots by solid ceramic portions between said slots, said slots of each said ceramic element being offset relative to said slots of said other ceramic element and aligned with said solid portions of said other ceramic element, the width of said slots being greater than said filter distance between said faces, the space between said faces forming a plurality of filter passages of restricted height preventing movement through said filter passages of particles of a dimension larger than said filter distance, said first and second ceramic elements forming a flow path for the flow of molten metal through a slot in said first ceramic element which flow path turns and divides after it passes through said first ceramic element and then flows in two generally opposite directions through said filter passages between said ceramic elements and then turns again and flows through slots in said second ceramic element, said filter passages having the smallest transverse dimension of any part of the flow path of molten metal through said filter.

4. A ceramic filter for molten metal comprising a first ceramic element and a second ceramic element positioned adjacent to each other and arranged to receive a stream of molten metal to flow therethrough, means maintaining a fixed position of said ceramic elements relative to each other, said first ceramic element having a first face and said second ceramic element having a second face, said ceramic elements positioned with said first and second faces parallel and opposed to and spaced apart from each other to define a planar relief cavity therebetween, the distance between said faces defining a filter distance, each of said first and second ceramic elements having a plurality of slots formed therein defining flow passageways at an angle to said faces for the flow of molten metal therethrough, said slots in each of said ceramic elements being separated from adjacent slots by solid ceramic portions between said slots, said slots of each said ceramic element offset being relative to said slots of said other ceramic element and aligned with said solid portions of said other ceramic element, the width of said slots being greater than said filter distance between said faces, the space between said faces forming a plurality of filter passages of restricted height preventing movement through said filter passages of particles of a dimension larger than said filter distance, said first and second ceramic elements forming a flow path for the flow of molten metal through a slot in said first ceramic element which flow path turns and divides after it passes through said first ceramic element and then flows in all directions of said planar relief cavity radiating outwardly from said slot through said filter passages between said ceramic elements and then turns again and flows through slots in said second ceramic element, said filter passages having the smallest transverse dimension of any part of the flow path of molten metal through said filter.

* * * * *